Jan. 9, 1923. 1,441,278.
S. HALVORSEN.
NEWSPAPER STUFFING MACHINE.
FILED APR. 15, 1919. 11 SHEETS—SHEET 1.

Inventor
SEVERIN HALVORSEN
By Reynold D. Cook
Attorney

Jan. 9, 1923.

S. HALVORSEN.
NEWSPAPER STUFFING MACHINE.
FILED APR. 15, 1919.

Inventor
SEVERIN HALVORSEN
By Reynolds Cook
Attorney

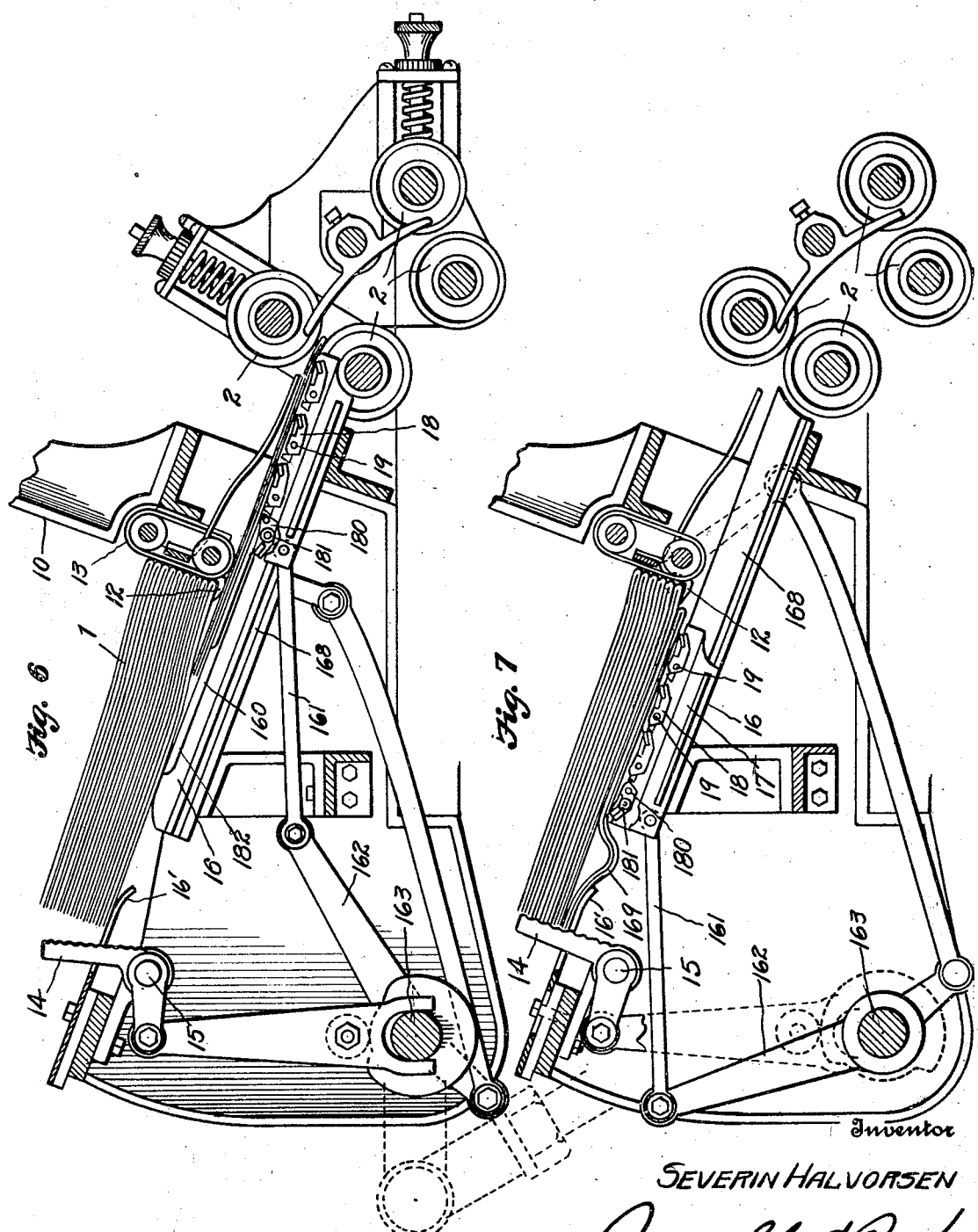

Jan. 9, 1923.
S. HALVORSEN.
NEWSPAPER STUFFING MACHINE.
FILED APR. 15, 1919.
1,441,278.
11 SHEETS—SHEET 7.
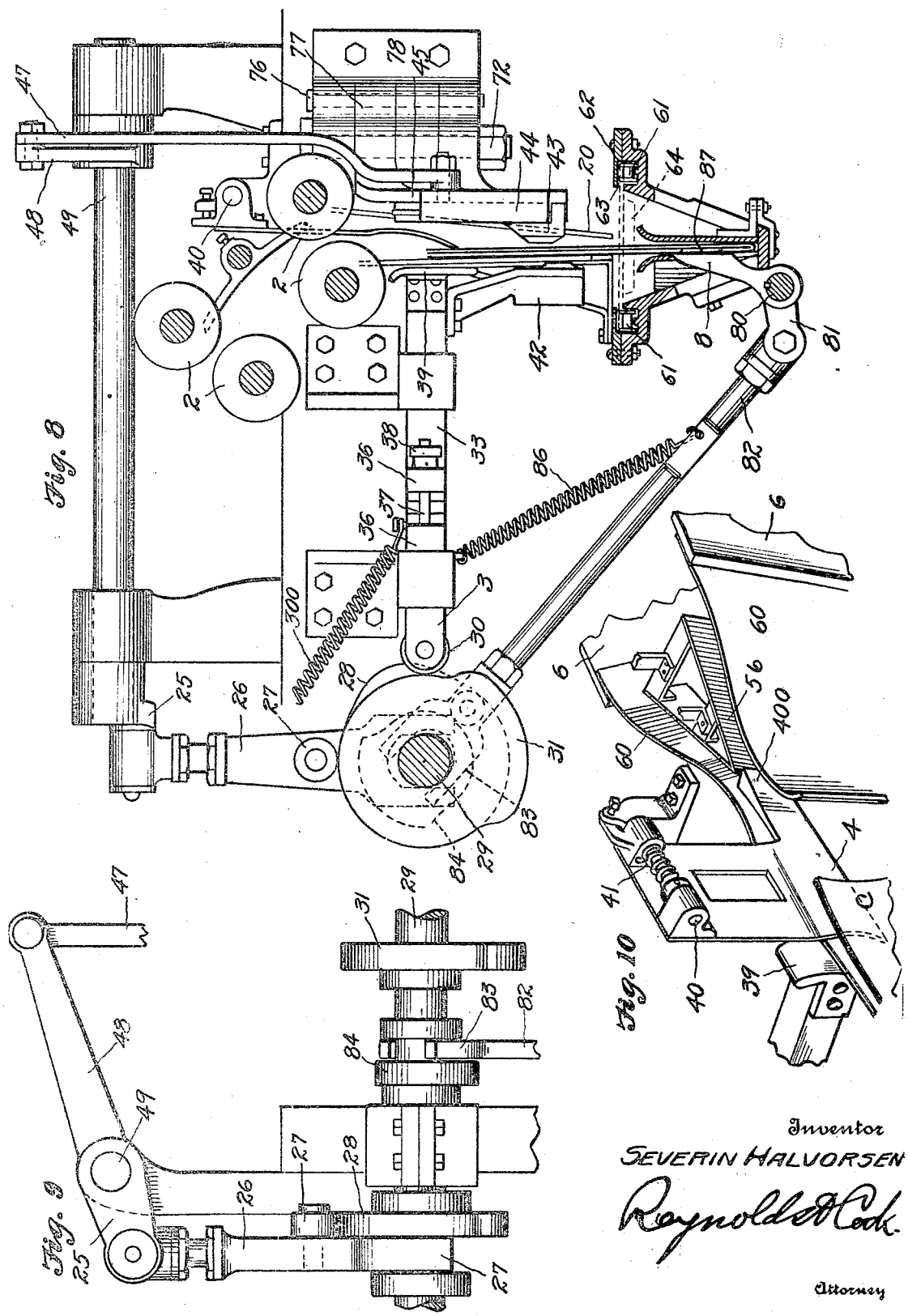
Inventor
SEVERIN HALVORSEN
Reynolds & Cook
Attorney

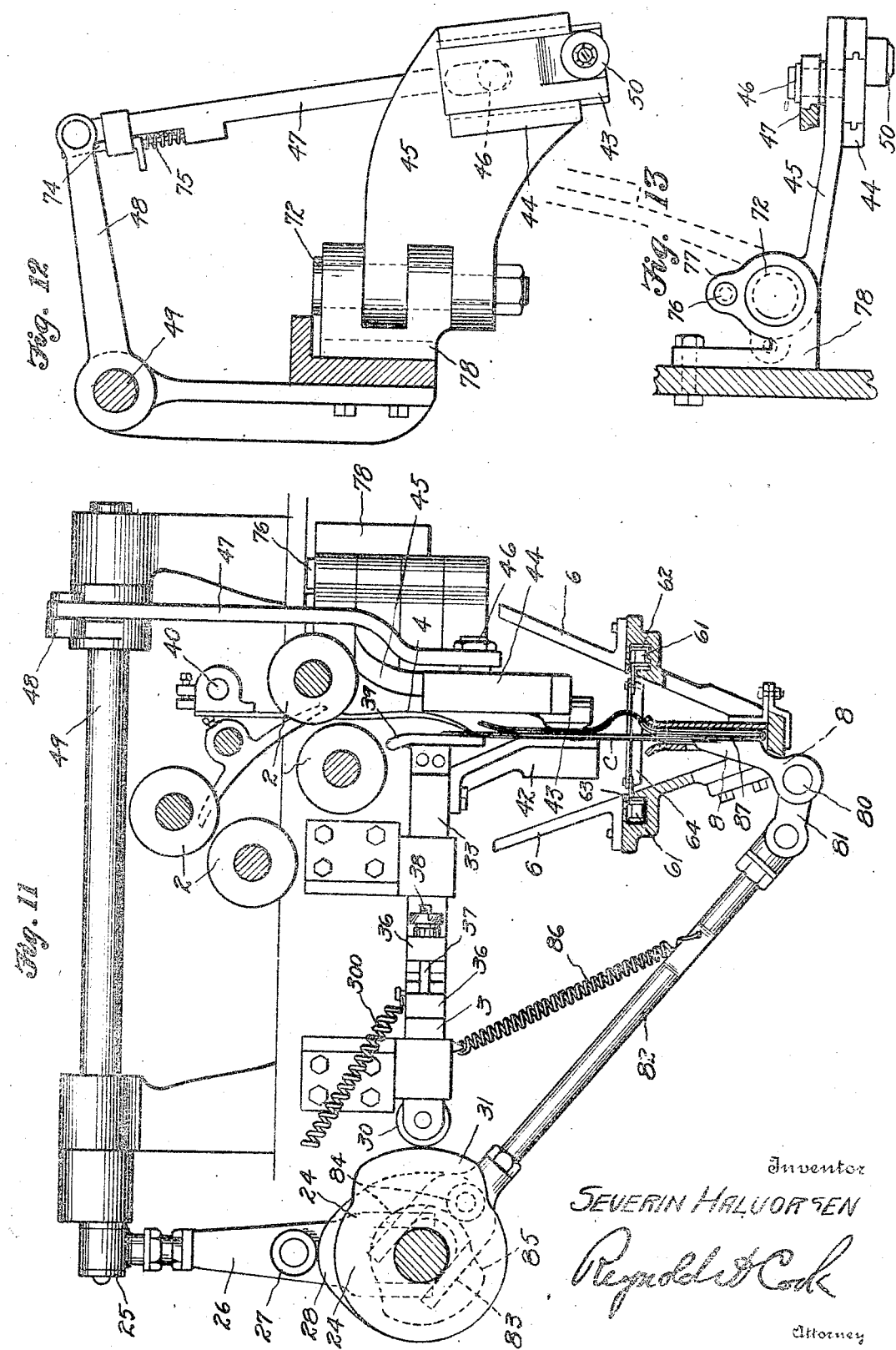

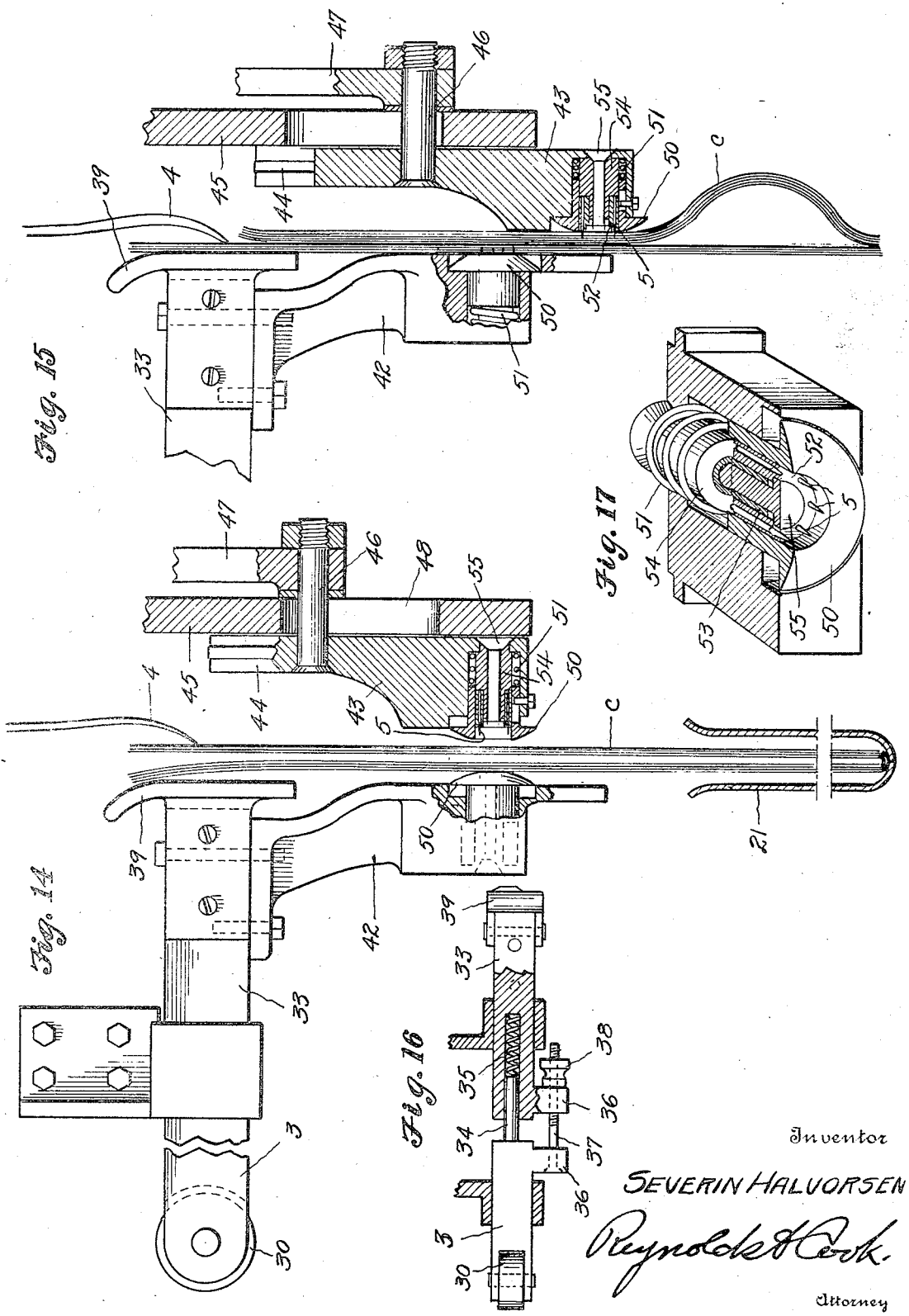

Jan. 9, 1923.
S. HALVORSEN.
NEWSPAPER STUFFING MACHINE.
FILED APR. 15, 1919.
1,441,278.
11 SHEETS—SHEET 10.
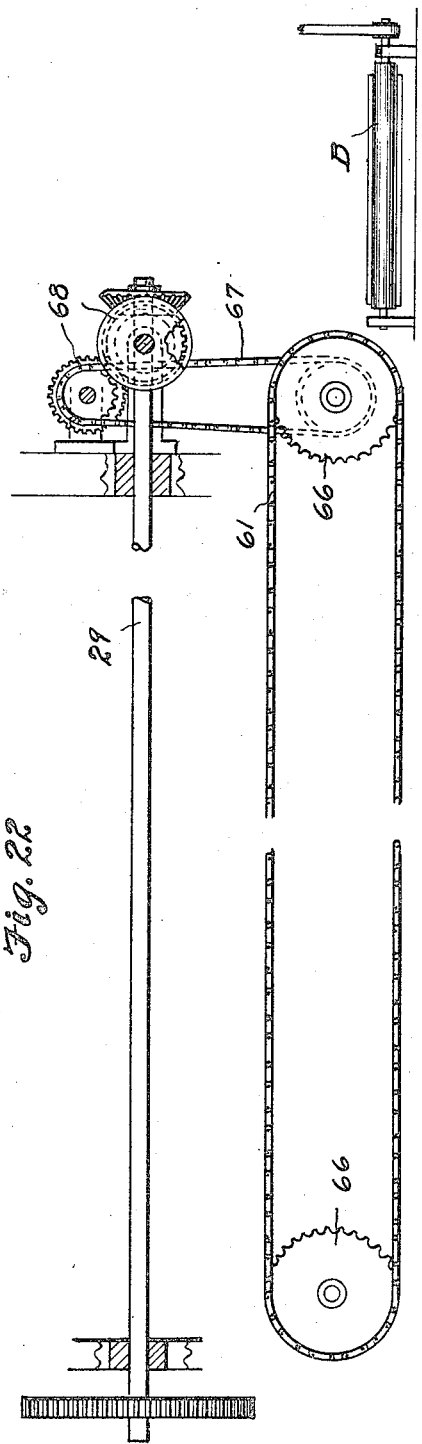
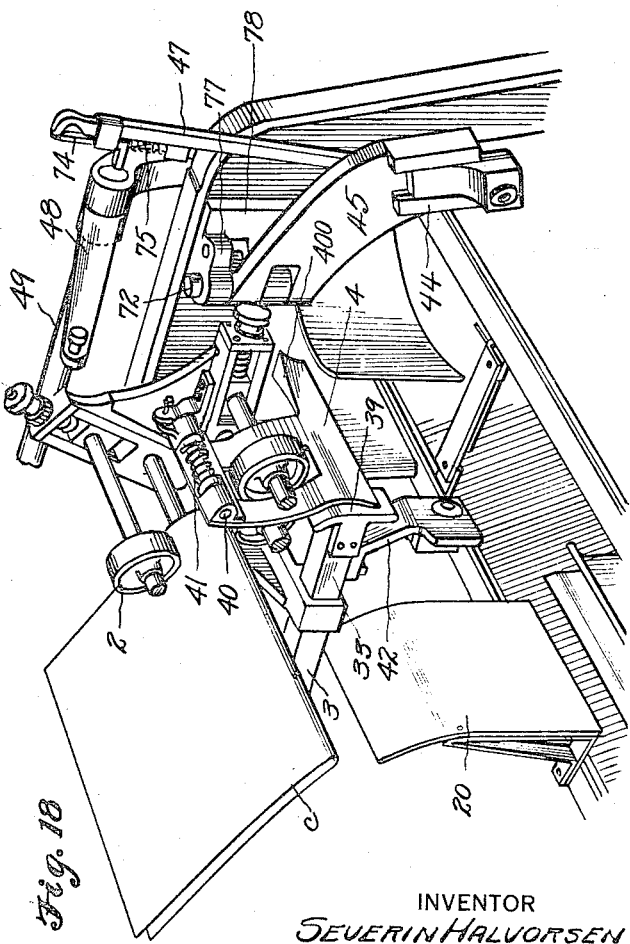
INVENTOR
SEVERIN HALVORSEN
BY
ATTORNEY

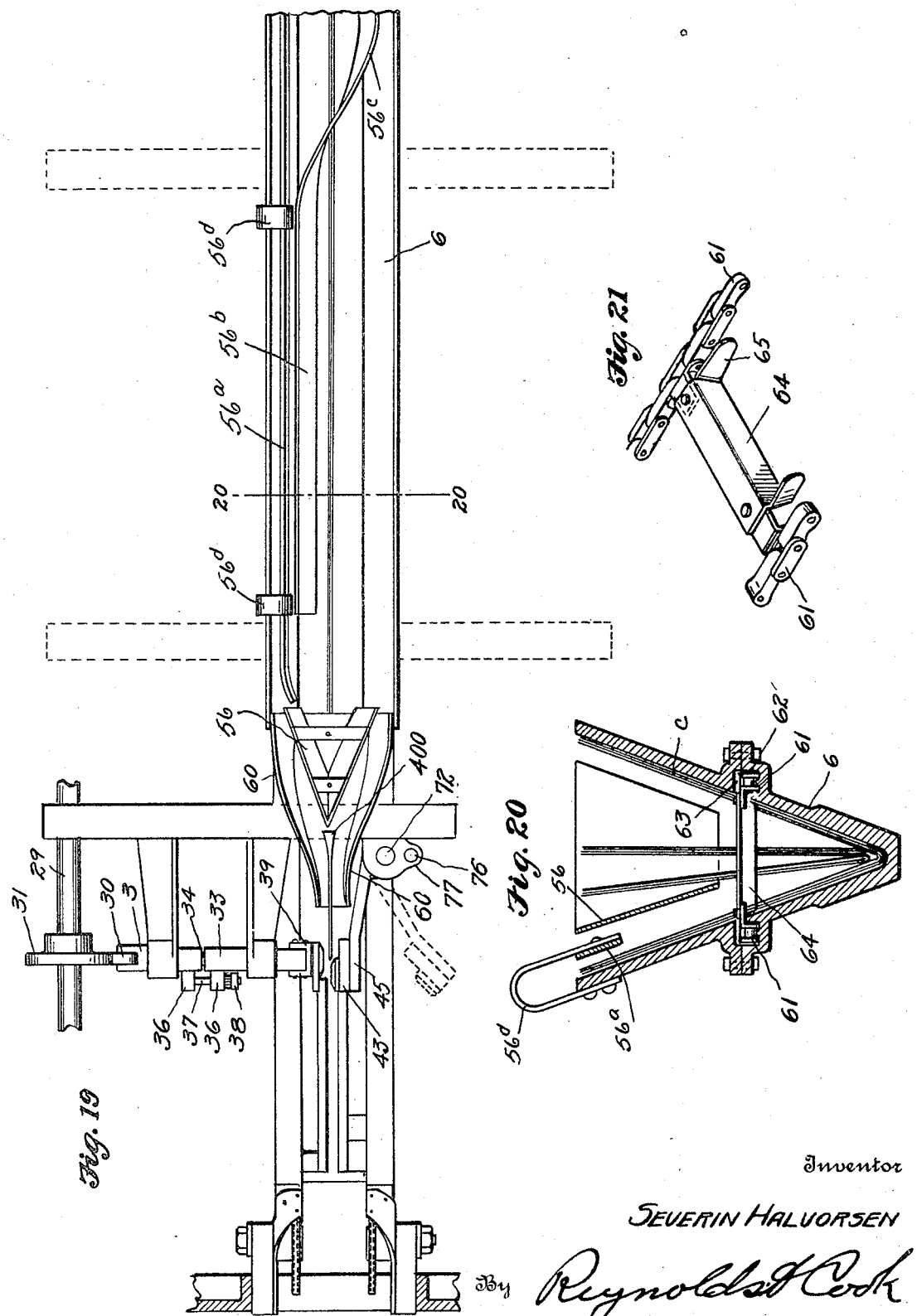

Patented Jan. 9, 1923.

1,441,278

UNITED STATES PATENT OFFICE.

SEVERIN HALVORSEN, OF SEATTLE, WASHINGTON.

NEWSPAPER-STUFFING MACHINE.

Application filed April 15, 1919. Serial No. 290,184.

*To all whom it may concern:*

Be it known that I, SEVERIN HALVORSEN, a citizen of the United States, and resident of Seattle, King County, Washington, have invented certain new and useful Improvements in Newspaper-Stuffing Machines, of which the following is a specification.

My invention consists of a machine designed for assembling the various sections of a newspaper which is printed in a plurality of sections, so as to include them all within one cover section. This operation is what is known in newspaper offices as "stuffing" the papers.

I, therefore, call my invention a newspaper stuffing machine.

The object of my invention is to provide a machine which will do this work automatically of assembling all of the other sections of a newspaper within one outer or cover section, and to do this with certainty and rapidity.

The features of my invention which I deem to be new will first be described in the form of construction illustrated in the drawings; and the principles involved therein and the combination of parts which I deem to be new will be particularly defined by the claims.

The accompanying drawings show my present invention in the form of construction which I now prefer.

Figures 6 and 7 are transverse sectional elevations taken through the paper delivering mechanisms of one of the heads.

Figure 8 is a transverse sectional elevation taken through the mechanism by which the opening of the cover section is accomplished.

Figure 9 is a view showing the means whereby part of the paper opening mechanism is operated.

Figure 10 shows in perspective the separator plate and spreader together with the pressing foot and the receiving end of the trough by which the paper is opened.

Figure 11 is a section taken through the paper opening mechanism showing the paper in somewhat different position from that shown in Figure 8.

Figure 12 shows from the inner side an elevation with parts in section of the means employed for operating the reciprocating presser foot by which the paper is opened.

Figure 13 is a top or plan view of the same mechanism.

Figures 14 and 15 are transverse sectional elevations on a larger scale showing more in detail the construction and manner of operation of the presser feet by which the paper is handled in opening.

Figure 16 is a plan view and partial section of the presser foot which engages the back side of the paper section.

Figure 17 is a perspective showing in section the construction of the paper engaging and feeding member.

Figure 18 shows in perspective the parts of the head section which are employed for opening the cover section with one of the paper engaging presser feet swung outward in position to give access to the paper receiving pocket.

Figure 19 is a top or plan view showing the relative position of the paper opening mechanism and the trough or guide through which the paper is fed while receiving the insert sections.

Figure 20 is a transverse section taken on the line 20—20 of Figure 19.

Figure 21 shows in perspective a section of the feeding chain showing one of the connecting bars by which the paper is engaged for feeding lengthwise of the trough.

Figure 22 shows the manner in which the paper feeding chain is operated and its connection with the paper delivering mechanism.

Figure 4:
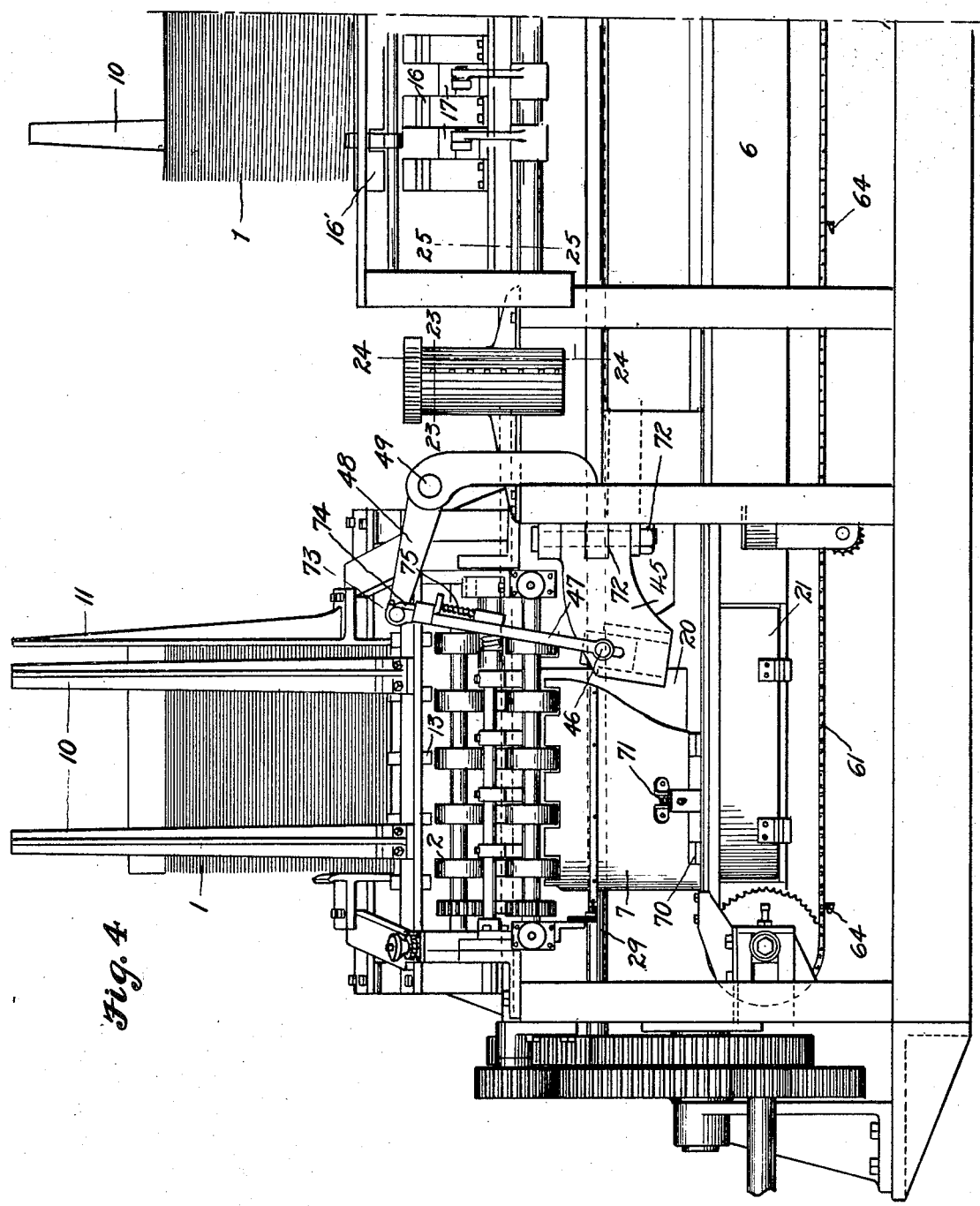
Figure 4 is a side elevation of one end of the machine showing the head which handles the cover section and a part of the next set of heads which handle insert sections.
Figure 5:
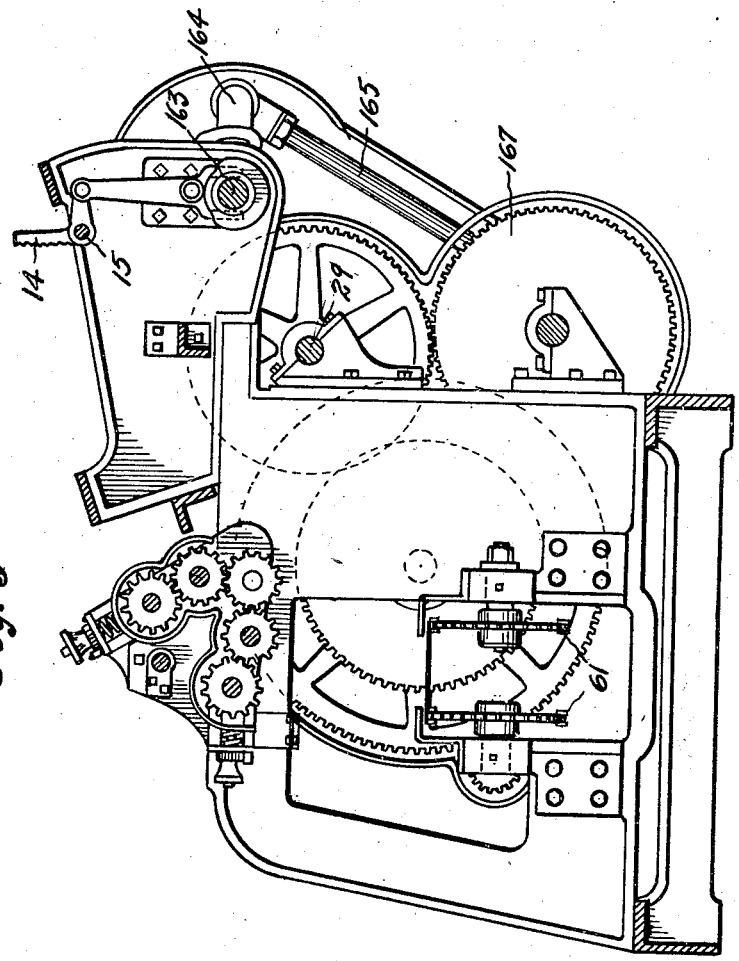
Figure 5 is an end elevation of the opposite or delivery end of the machine.
Figures 23, 24:
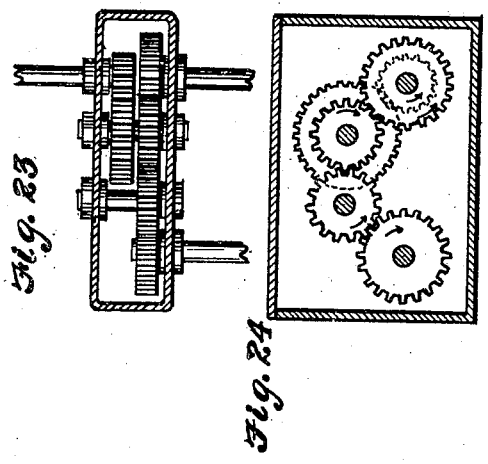

Figures 23 and 24 are respectively horizontal and transverse vertical sections taken respectively on the planes indicated by the lines 23—23 and 24—24 of Figure 4.

Figure 25:
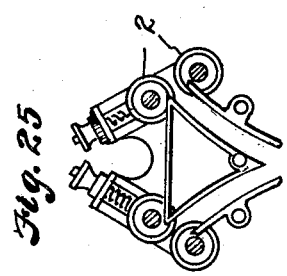

Figure 25 is a section taken upon the lines 25—25 of Figure 4 showing the relative position of the paper feeding rolls.

This machine employs a plurality of paper feeding heads, the number depending upon the number of sections which are to be assembled at one time within one of these sections.

These various heads are arranged along a central axis, along which axis extends a trough, or equivalent paper guiding and feeding mechanism, to one end of which the cover section is delivered, folded edge downward, at which point and as it starts its travel along the trough, it is opened to a V-shape in such manner as to receive the insert sections. The insert sections are delivered from the other heads into this cover section as it passes in front thereof, and the final result, namely, the complete stuffed paper, is delivered at the opposite end of the machine. The number of insert heads employed will depend of course upon the number of sections which are to be assembled in one paper. I have illustrated one cover head and two insert heads. The two insert heads are placed one at each side of the central axis, and the two insert sections are delivered into the cover section at the same time and place.

As many additional insert heads as desired may be placed in succession along the course of the conveying trough and these may be placed at both sides of the trough or all at one side, as desired.

Figure 1:
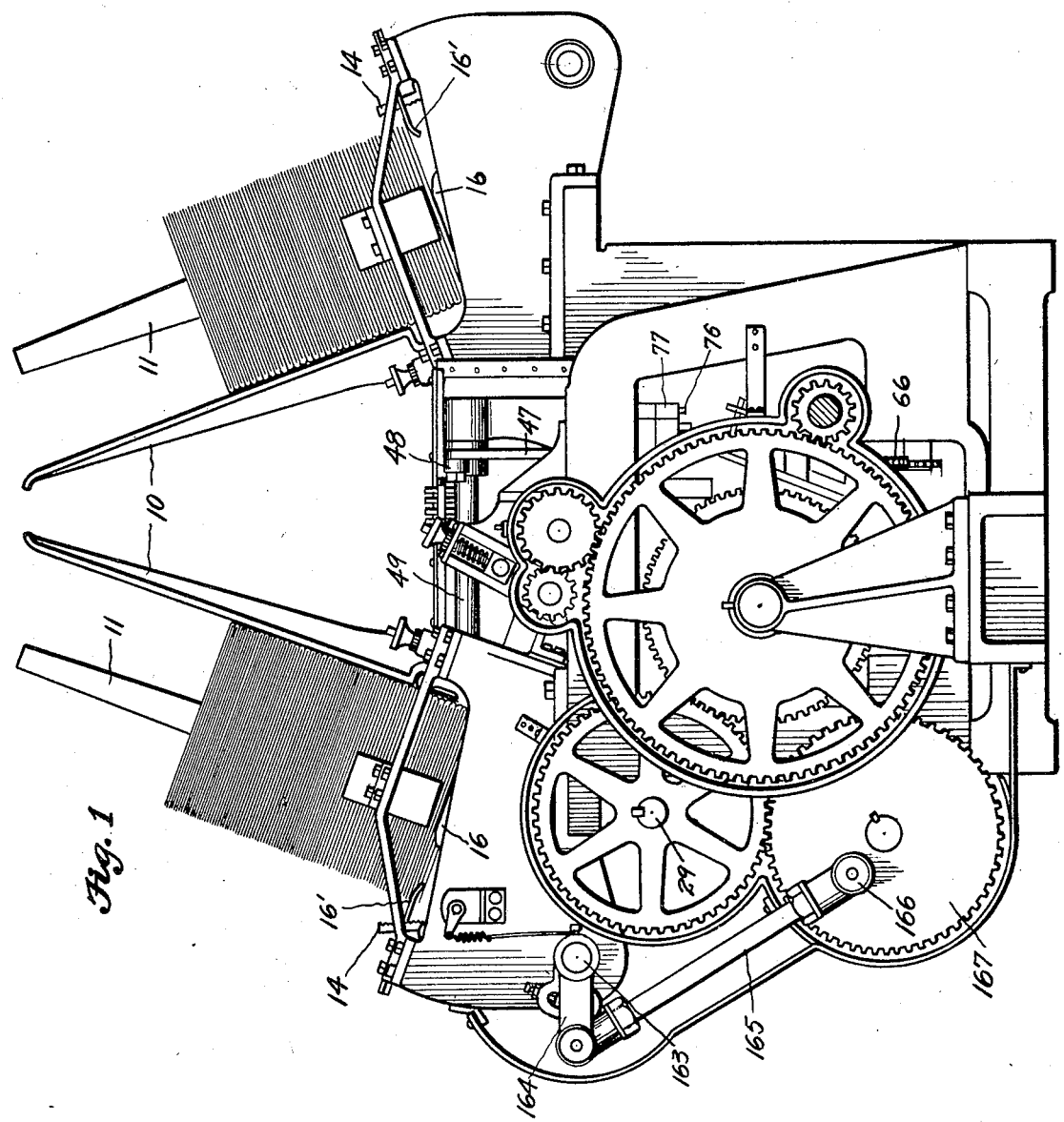
Figure 1 is an end elevation of the machine taken from the head end, that is the end at which the operation of stuffing begins.
Figure 2:
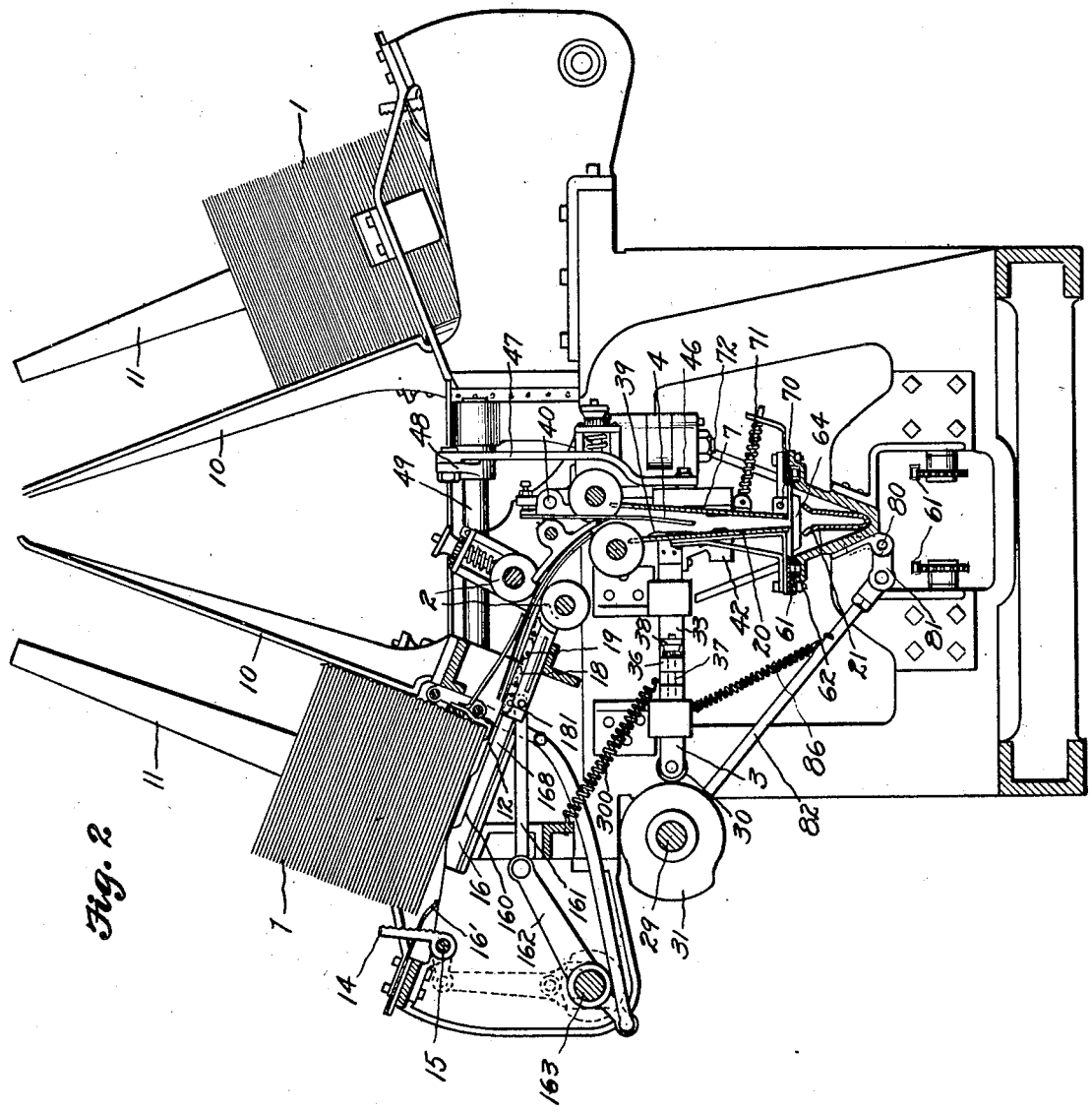
Figure 2 is a transverse sectional elevation taken through the head which carries the paper opening mechanism.

In Figure 2 is shown a transverse sectional elevation taken through one end of the cover head and that end of the trough, while in Figure 4 is shown a side elevation of the cover or opening head and a portion of the adjacent insert head.

The means for delivering the papers from a stack are the same for all of the heads. The particular mechanism employed for this purpose is not material to my present invention. It will suffice if it may be depended upon to deliver reliably and accurately a single paper at a time to the opening and the assembling mechanism.

I have shown at 1 stacks of papers. These are put in position within openings formed by upwardly extending arms 10 and 11. The two arms 10 are at the side of the stack of papers which is next to the central axis of the machine, while the arm 11 is at one end of the paper stack.

Associated with these parts are devices whereby one paper at a time is removed from the bottom of each stack and is fed to the opening and assembling parts.

Figures 6 and 7 show sectional elevations of these parts.

The papers are taken as they come from the ordinary press, namely, folded transversely across the center of the page. The folded edges of the papers are placed against the standards 10, that is towards the central axis of the machine.

Beneath this edge of the stack of papers are placed supporting fingers or plates 12, which extend only a short distance under this edge of the paper. They, however, serve to hold this edge of the stack of papers slightly raised. At the same edge of the pile of papers I provide short feed belts or tapes 13, which are rotated in such manner as to force the papers downward. At the opposite edge of the stack of papers is a set of arms 14 which are oscillated upon a pivot shaft 15 so as to force the papers up into close contact with the arms 10 and tapes 13.

The stack of papers are supported upon bars 16 which, however, terminate somewhat short of the outside edges of the papers. At this point, namely, between the ends of the bars 16 and the supporting plate 16', is an opening or gap.

Mounted to reciprocate along the bar 16 is a block 17, which carries thereon a series of small blocks 18, each of which is provided with a paper engaging and feeding needle. These blocks are pivoted at one end by means of pivots 19. Their opposite ends carry the paper engaging and feeding needles and they are normally held upward against the paper by means of a spring.

One of these blocks, as the block 180 is oppositely positioned, its needle extending backward. This block carries a roller 181 which is adapted to engage with a flange 160 carried by the bar 16 so that it is swung downward into position where its needle will not engage the papers except at the outermost portion of the stroke of the bar.

The bar 16 is connected by means of a link 161 with a crank arm 162, and this is oscillated by reason of its being connected with a shaft 163 which is oscillated through the action of an arm 164, link 165, and a crank pin 166, carried by a wheel or disk 167.

When the block 16 is moved upwardly, or up its inclined guideway 168, the needles carried by the blocks 18 have no effect upon the paper. The needles carried by the block 180, however, engage the paper somewhat before the termination of the upward movement of the block. As a result they pull the paper backward, releases the under paper from the supporting fingers 12, and buckle the paper to form a ridge or lap 169. Upon the return movement of the block 16 the needles carried by the small pivoted blocks 18 engage this paper which has been freed from the fingers 12 and draw it outward. It passes under the fingers 12 and is delivered to the feed rollers 2. The paper is then discharged from these feed rollers into the trough, where it is acted upon by the paper opening mechanisms.

The papers when discharged from the feed rolls 2, enter a pocket or receptacle, in which they are acted upon by the opening mechanism. This receptacle or pocket, has two side plates 20 separated a short distance. Beneath these, and separated somewhat from their lower edge, is a third plate 21, which is bent into the form of an inverted V, or narrow U. The paper when delivered from the stack is fed into the opening mechanism with the folded edge of the paper forward. When received in the opening mechanism it thus stands in vertical position with the folded edge downward.

Supported upon the frame so as to have a reciprocating movement transversely thereof, or towards and from the paper in the opening mechanism, is a presser bar which is shown in detail in Figure 16 and which is also illustrated in Figures 2, 11, 14 and 15. This presser bar is shown as being square in cross section. This shape is adopted as a convenient means for preventing rotation. Otherwise, it might be of any cross section suitable. The end 3 of this presser bar is provided with a roller 30, journaled therein which engages with the peripheral surface of a cam 31, whereby the presser bar is given an intermittent forward feeding movement and is held forward for a short time. The other half 33, of the presser bar is alined with the half 3. The adjacent ends of these two parts are maintained somewhat separated. These two parts are connected in such a way that they are normally held apart by a spring and also by a bolt or other means, which limits the amount of this separation. In consequence the two parts may be pushed closer together but can not be lengthened. As shown the part 33 is provided with a bore extending lengthwise thereof in which is inserted a rod 34 carried by the section 3. Within the bore in the section 33 is placed a spring which acts to maintain the two parts in separated position. Each of the parts 3 and 33 are provided with arms 36, through which passes a bolt 37. By adjusting the position of the nut 38 of this bolt the degree of separation between the two parts may be accurately and very minutely controlled. This is very desirable as the position of the working face of this bar relative to the paper must be adjusted to compensate for different thicknesses of cover sections employed. In other words, a 32-page cover section requires a different adjustment from that required by a 16 page cover section.

Upon the end of the presser bar section 33 is placed a foot 39, which is in position to engage the upper edge of the cover section C.

At the opposite side of the cover section C is a separator plate 4. This separator plate is so positioned as to engage the side face of the newspaper cover section near its upper edge and towards one side of the paper, this being the side which is towards the main body of the machine, or the direction in which the cover section is fed in order to receive the insert sections. The relative position of these parts is well shown by the perspective of Figure 10. It is thus seen that the separator plate 4 engages only with one corner of the paper, and at a slight distance below its upper edge. This separator plate is preferably held in a yielding manner by being pivoted at its upper end upon a pin 40 and by having a spring 41 acting thereon so as to hold its lower edge towards the foot 39 of the presser bar.

Secured to the end of the presser bar 33, which is towards the paper, is an arm 42, which arm extends downward and carries near its lower end a paper engaging and holding element. Substantially opposite to this and adapted to engage the opposite side of the paper is a like paper engaging and feeding mechanism which is mounted in a block 43, which block is mounted to reciprocate in guides 44 carried by an arm 45.

The paper engaging and feeding mechanisms carried by the block 43 and the arm 42 are shown in detail in Figures 14, 15, and 17. These employ a member carrying a series of pins 5, which are so held as to project beyond the main face, both of the block 43 and the arm 42, as is clearly shown in Figure 14. Associated with these is a ring or annulus 50, which has a coned outer face and is normally held projected, as by means of a spring 51, so that the base of the cone is substantially flush with the face of the member 42 or 43, as the case may be. In this position the needles 5 are covered so that they cannot engage with the paper. If, however, relative movement be given to the two parts 42 and 43 so as to compress the springs 51 the needles 5 will be pressed into the paper. The projection of the needles 5 is controlled in amount by the thickness of the paper which is to be opened. When a thick cover section is being employed a longer projection of needles is used than where a thinner cover section is being employed.

The manner of adjusting the projection of the needles 5 is as follows: These needles 5 are placed within holes bored in a sleeve 52, which sleeve fits within the bore in the sleeve of which the outer ring 50 is a part. The sleeve 52 fits over another sleeve 53, which is shouldered to receive the inner end of the sleeve 52 and which has the spring 51 surrounding a section thereof inside of the ledge 54, against which the end of the sleeve 52 abuts. These parts are held in position by a bolt 55 which engages with a slight ledge formed on the inner surface of the sleeve 52 and also with the back side of the sliding block 43. By removing the sleeve 52 the needles 5 may be removed and other needles inserted which are of different length. The arm 42 has no movement except one of reciprocation towards and from the paper such as has been described. The block 43 is, however, mounted in the guideways 44 so that it may have a certain amount of vertical reciprocation, that is of movement towards and from the folded edge of the paper in a direction which is substantially parallel with the plane in which the paper is placed.

The block 43 is connected by means of a pin 46, with a rod or link 47. The pin 46 passes through a slot 48 in the arm 45. The link 47 is secured to an arm 48 which is mounted upon a shaft 49 so as to oscillate. This arm 49 extends transversely of the machine and is provided at its other end with an arm 25 which is connected with a link 26. This link is provided with a cam roller 27 which engages with the surface of a cam 28 carried by shaft 29. The link 27 is shown as having a yoke 24 which embraces the shaft 29 and prevents side movement thereof. In consequence the block 43 is given a reciprocating movement in a substantially vertical direction.

Figure 14 illustrates the position of the parts of the opening mechanism when the cover section has been put in place therein, but before the opening mechanism has acted thereon.

Figure 15 shows the position of the same parts after the block 43 has been moved downward. Prior to the downward movement of the block 43, the cam 31 which acts upon the presser bar 3 and 33, has acted to force the presser foot 39 and the arm 42 towards the paper. This has clamped the paper between the arm 42 and the block 43 in such manner as to force the annular rings 50 inward and to insert the needles 5 into the paper. These needles are made of such a length that they will not pass beyond the center of the paper from each side. In consequence the needles at one side have no engagement with the half of the paper which is at the opposite side. In consequence, when the block 43 is moved downward, it carries with it its half of the paper. This movement is sufficient to withdraw that half of the paper from beneath the separator plate 4 and produces a position of the parts such as is shown in Figure 15. The spring acting upon the separator plate 4 causes it to press closely against the front face of the rear half of the paper which half has not been moved downwardly, but which has been held in place by the engagement of the needles carried by the arm 42. Block 43 then moves upward carrying its half of the paper up with it. As the lower edge of the separator plate 4 is made quite thin, the upper edge of the outer half of the paper then passes outside of the separator plate. This position of the separator plate with relation to the paper is shown in Figure 10.

By the above mechanism the two halves of the paper have been separated and a separator plate 4 has been inserted between them. This separator plate extends horizontally beyond the edge of the paper in the direction in which the paper is fed for the reception of the insert sections. This outer end of the separator plate is enlarged, as shown at 400. In alinement with this and having a narrow edge which will insure its entering between the two sides of the paper, is the spreader 56. If the paper be moved edgewise in this direction, it is evident that it will have its two sides separated to such an extent that it will be in position to receive insert sections which may be fed thereto.

Associated with these parts is the trough 6. This has its side walls inclined to each other at a sufficient angle to insure maintaining the cover section in opened position. The angle of these parts is well shown in Figures 2 and 11. At the end next to the paper opening mechanisms it is provided with plates 60 which converge towards the opening mechanism and between which and the spreader 56 the two sides of the newspaper pass. Associated with the trough 6 is a paper feeding or carrying chain 61. Two such chains are employed one at each side of the trough. These chains are preferably enclosed within pockets 62, formed in the body of the trough so that the chains themselves may never come in contact with the paper. The inner wall of the trough at each side is provided with a slot 63 connecting with the conduit or passage 62, in which the chains lie. Through this extend arms which are connected with bars 64 which extend across the trough. These are placed at such a point as to pass between the lower portion 21 of the pocket which receives the cover section and the parts above the same. They engage the paper at a point about midway between its upper and lower edges and carry it through the trough. One of these bars is shown in detail by perspective in Figure 21. This is shown as having short arms 65 at its end which slightly overlap the side faces of the paper. The chains 61 are given a continuous forward movement. They may be driven in any convenient and suitable manner. The manner of driving which has been adopted by me is shown in Figure 22. Two pairs of sprocket wheels 66 are placed at opposite ends of the machine and are driven through a chain 67 and gears as 68. The particular mechanism by which these are driven is, however, immaterial.

At the termination of the spreader 56 is a retainer bar 56$^a$ which parallels the side of the trough at or below the edge of the cover section as it passes along the trough to receive the insert sections. This bar is supported by arms 56ᵈ, of U-shape, from the side of the trough. These arms 56ᵈ together with the bar 56ᵃ hold one side of the cover section down and prevent the inserts from engaging the edges of the cover section when entering the trough.

To insure that the opposite side of the cover section and the inserts as received are carried to and held close to the opposite wall of the trough, a second series of retaining bars is employed. The end 56ᵇ of these which is towards the cover opening head is positioned close to the bar 56ᵃ but the opposite end 56ᶜ is curved to the opposite side of the trough. A separate bar of this kind is provided for each insert head to carry the insert sections to the opposite side of the trough so that they will be out of the way of the later entering insert sections. Each such bar thus extends throughout substantially the extent of two heads one end being near one side of the trough and the other near the opposite side. By these means the sections previously inserted do not interfere with those inserted later.

Figure 3:
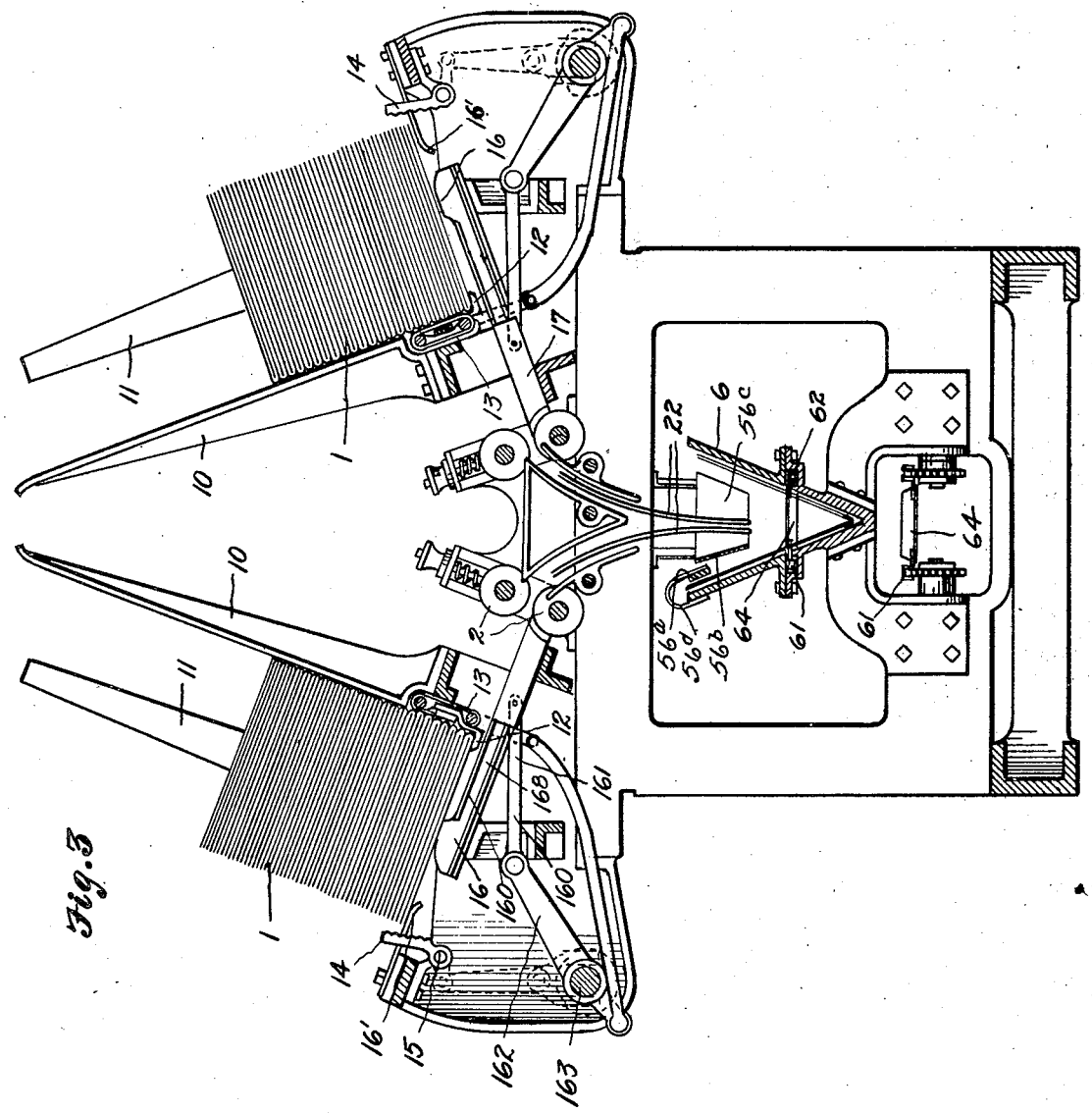
Figure 3 is a section taken through a pair of heads following after that shown in Figure 2, these heads handling insert sections.

The paper after leaving the head which carries the cover section, and after being opened by the mechanism described, is passed along the axis of the machine beneath the various heads in which the insert sections are placed. In Figure 4 I have shown a part of one of these heads. These have means for holding and delivering the papers the same as has been described with the first head, or that which contains the cover sections. It is, therefore, not necessary to describe its mechanism in detail and especially as the means for delivering the papers from the stacks is not a part of this present invention. It will suffice to say that the operation of these devices are timed in such a way as to deliver the insert section of which two are shown at 22 in Figure 3 into the cover section as it passes. The number of insert heads to be employed may be made whatever is desired. They may also be placed in pairs, one at each side of the central axis of the machine as has been shown in Figure 3. When the paper reaches the delivery end of the machine it is turned down sideways and received upon rolls or feeding tapes as shown at B in Figure 22. The plate 7 which lies in front of the cover section while it is being opened is hinged at its lower edge as shown at 70 so that it may swing outward. Normally this is held up in position by means of a spring as shown at 71. In consequence this may be easily drawn outward if at any time anything happens to a cover section to prevent the proper operation of the parts.

The reciprocating paper opening or feed block 43 is mounted in an arm 45 which in turn is pivoted upon a vertical pivot at 72 so that it may be swung outward so as to clear the pocket in which the paper opening has been done. In order to permit this it is necessary to have the operating connection for the link 47 disengageable. This may be done in a variety of ways. The manner of doing this which is herein illustrated consists in forming the upper end of the link 47 as a hook opening to one side and closing this hook normally by means of a slide bolt 74 which is held in closed position by means of a spring as 75. It is thus easy to release this link and to swing the arm 45 outward.

The arm 45 is held in working position by means of a pin 76 which passes through holes in ears 77 carried by the arm and by the bracket 78 upon which it is pivoted. By removing this pin 76 and pulling downward the bolt 74 the arm 45 may be swung outward so as to give free access to the paper opening mechanisms.

When the cover section is delivered to the pocket in which it is to be opened it is possible that when it strikes the bottom thereof it might rebound and thus be caught by the separator plate 4 too far below its upper edge and the opening mechanism thus fail to properly function. To prevent this I provide a lever arm 8 which is pivoted upon a shaft 80 and which is given an intermittent rocking movement through a crank arm 81, link 82. Link 82 is shown as having its opposite end provided with a yoke 83 which spans the shaft 29, and as also carrying a cam roller 84 which engages with a cam 85 by which the link is reciprocated and the paper holding arm 8 is moved toward and from the paper. The backward movement of the link 82 is secured by means of a spring 86. The backward movement of the presser bar 3 is also secured by means of a spring 300. The paper holding arm 8 is provided upon its face with teeth or other means by which it may securely engage and hold the paper. These paper holding means are preferably needles 87 which are inclined downward and which are supported in a yielding manner as by being pivoted in a manner similar to the needles of the paper delivering mechanisms carried by the blocks 18 so that the paper may slide down over these needles without any resistance but not bound backward as they will be caught by the needles. Prior to the movement of the paper out of the opening pocket the cam has acted upon the arm 8 in such a manner as to swing it backward and thus release the paper.

What I claim as my invention is:

1. In a device for opening a folded paper, a separator plate adapted to engage a face of the paper near the edge which is opposite to the fold, and means for withdrawing the half of the paper which is engaged by said separator plate from beneath said plate.

2. In a device for opening a folded paper, a separator plate adapted to engage a face of the paper near the edge which is opposite to the fold, means for withdrawing the half of the paper which is engaged by said separator plate from beneath said plate, and means for feeding the paper in a direction parallel with the folded edge.

3. In a device for opening a folded paper, a separator plate adapted to engage a face of the paper near the edge which is opposite to the fold, means for withdrawing the half of the paper which is engaged by said separator plate from beneath said plate, a spreader forming an extension of the separator plate beyond the edge of the paper, and means for feeding the paper to pass it over said spreader.

4. In a device for opening a folded paper, a separator plate engaging a face of the paper near the edge which is opposite the fold, a feeder foot engaging the half of the paper which is engaged by the separator plate, means for reciprocating said feeder foot to withdraw that half of the paper from beneath said plate, a spreader located in alinement with the separator plate at one side of the paper and means for feeding the paper edgewise to pass it over said spreader.

5. In a device for opening a folded paper, a separator plate adapted to bear upon a face of the paper near the edge which is opposite the fold, two feeding feet engaging opposite faces of the paper, means for reciprocating that one of these which is engaged by the separator plate towards and from the folded edge of the paper to withdraw this half of the paper from beneath the separator plate.

6. In a device for opening a folded paper, a separator plate adapted to bear upon a face of the paper near the edge which is opposite the fold, two feeding feet engaging opposite faces of the paper, means for reciprocating that one of these which is engaged by the separator plate towards and from the folded edge of the paper to withdraw this half of the paper from beneath the separator plate, a spreader alined with the separator plate, and means for feeding the paper to pass it over said spreader.

7. In a device for opening a folded paper, a receiving pocket for the paper, a separator plate bearing against one face of the paper adjacent to the edge which is opposite to the fold, a feeding foot engaging with the same face of the paper, and means for reciprocating said feeding foot towards and from the folded edge of the paper to withdraw one ply from beneath the separator plate.

8. In a newspaper stuffing machine, in combination, a series of paper receiving and delivering heads arranged in succession along an axis and provided with means for delivering one paper section at a time, a paper opening mechanism associated with the first head of the series, means for continuously moving the opened cover section along said axis, means for maintaining said cover section open during said movement and means for delivering a section into said opened cover section from each of the other heads as the cover section passes.

9. In a newspaper stuffing machine, in combination, a series of paper receiving heads arranged along an axis, means for delivering paper sections singly from each of said heads, a paper receiving and guiding trough extending along said axis and receiving the papers as discharged from the heads, means for opening the cover section received from the first head, a continuously moving conveyor chain extending along said trough and carrying bars adapted to engage the vertical edges of the papers in said trough to move them along, and means for maintaining the cover section open as it passes along said trough.

10. In a newspaper stuffing machine, in combination, a series of paper receiving heads arranged along an axis, a paper receiving and guiding trough extending along said axis, means for delivering a cover section of paper from the first head to the trough, means for opening said cover section, means for continuously moving the cover section along said trough, guide bars between the plies of the cover section acting to positively hold the sections open during its passage along said trough, and means for delivering sections from the other heads in succession into said cover section as it passes.

11. In a newspaper stuffing machine, in combination, a series of paper receiving heads disposed along an axis, means for delivering paper sections singly from each head, means for opening the paper section from the first head, and means for carrying the opened cover section by an uninterrupted movement along in position to receive in succession the paper sections delivered from the other heads.

12. In a newspaper stuffing machine, in combination, a series of paper receiving heads disposed along an axis, means for delivering paper sections singly from each head, means for opening the paper section from the first head, means for uninterruptedly carrying the opened cover section along in position to receive in succession the paper sections delivered from the other heads, and a bar within and close to one side of the cover section as it moves along the insert heads, and a bar for each insert section having a curved end adapted, as the insert section is carried before the next insert head, to transfer the previously inserted section to the opposite side of the cover section.

13. In a device for opening a folded paper, in combination, a pocket or trough for receiving a folded paper resting upon its folded edge, a paper grip adapted to grip the paper as it is deposited in said pocket to prevent its rising, a separator engaging with one face of the paper just below its upper edge, means for withdrawing the half of the paper next to said separator plate below the lower edge of said plate.

14. In a device for opening a folded paper, in combination, a pocket or trough for receiving a folded paper resting upon its folded edge, a paper grip adapted to grip the paper as it is deposited in said pocket to prevent its rising, a separator engaging with one face of the paper just below its upper edge, means for withdrawing the half of the paper next to said separator plate below the lower edge of said plate, a spreader alined with said separator plate, and means for moving said opened cover section of the paper over said spreader.

15. In a device for opening folded paper, in combination, a paper receiving pocket, means for delivering a folded paper into said pocket with its folded edge downwards, means for engaging said paper to prevent its rising in the pocket, a separator engaging one face of the paper just below its upper edge and extending horizontally beyond the adjacent vertical edge of the paper, said extended end being expanded in thickness, presser and holding feet engaging opposite sides of the paper beneath said separator, and means for moving downwards towards the folded edge of the paper that feeding foot which is at the same side of the paper as the separator, to thereby withdraw that half of the paper from beneath the separator.

16. A device for opening a folded paper comprising a separator plate adapted to engage the paper close to an edge other than that where folded, a feeding foot engaging the same face of the paper and movable to withdraw one ply of the paper from beneath the separator plate.

17. In a newspaper stuffing machine, two pressers adapted to engage opposite sides of the cover section to open it, one presser having two parts movable relatively to each other to adjust for papers of different thickness, a spring acting between said two parts to permit yielding in case of feeding of more than one section at the same time, and means for reciprocating the other presser towards and from the folded side of the paper.

18. In a newspaper stuffing machine, in combination, a pocket for holding the folded cover section of a paper, a presser bar mounted at one side of said pocket to reciprocate towards and from said pocket, means for intermittently reciprocating said presser bar, a foot carried by said bar and adapted to engage one side of the paper, means carried by said foot adapted to engage the paper to prevent movement of the paper across the surface of said foot, and a foot mounted at the other side of the paper to be reciprocated towards and from the folded edge of the paper and carrying means to engage the paper so as to carry with it that half of the paper.

19. A paper feeding means for a paper opening mechanism comprising a foot mounted to be reciprocated parallel with the face of the paper, said foot having a socket extending inwards from its paper engaging face, paper engaging needles carried centrally of said socket and projecting beyond the face of the foot, a sleeve mounted to reciprocate in said socket and having a coned outer head and a spring back of said sleeve normally holding it outward to protect the paper from engagement with said needles.

20. A paper feeding means for paper opening mechanisms, comprising a foot mounted to be reciprocated parallel with the face of the paper, paper engaging needles carried by said foot, and a spring-projected protecting member normally projecting beyond the points of the needle and adapted to yield to permit engagement of said needles under a pressure applied thereto.

21. A paper feeding means for paper opening mechanisms, comprising a foot mounted to be reciprocated parallel with the face of the paper, paper engaging needles carried by said foot, and a spring projected protecting member normally projecting beyond the points of the needle and adapted to yield to permit engagement of said needles under a pressure applied thereto, said protecting member having inclined surfaces towards the paper which, when the member is projected, extend back to the face of the foot.

22. A paper feeding means comprising a foot mounted to move parallel with the face of a paper, and a paper engaging means comprising a sleeve having needle receiving bores extending lengthwise thereof and needles therein, and means for movably securing said sleeve to project the needles beyond the normal face of the foot.

23. A paper feeding mechanism comprising a foot mounted to be moved substantially parallel with the face of the paper, said foot having a socket extending from its feeding face, a needle carrying member removably secured in said socket, and a needle projecting member comprising a ring having a coned outer face also mounted in said socket and a spring beneath said ring normally holding it projected to protect said needles against engagement with a paper until said ring is pressed back.

24. A mechanism for opening folded papers for receiving inserts, comprising two members adapted to engage opposite sides of the paper towards the edge of said paper which is opposite to its fold, both of said members carrying means for preventing relative movement between said members and the paper, a separator plate engageable with one face of the paper near the edge which is opposite to the fold, and means for moving one of said first named members to withdraw that side of the paper beyond the line of engagement of the separator plate with the paper.

25. A mechanism for opening folded papers for receiving inserts, comprising two members adapted to engage opposite sides of the paper towards the edge of said paper which is opposite to its fold, both of said members carrying means for preventing relative movement between said members and the paper, a separator plate engageable with one face of the paper near the edge which is opposite to the fold, and means for moving one of said first named members to withdraw that side of the paper beyond the line of engagement of the separator plate with the paper, a spreader alined with the separator plate and means for moving the paper so as to pass over said spreader.

26. In a newspaper stuffing machine, means for opening a cover section, means for conveying said paper in a direction substantially parallel with the direction of its folded edge, a trough receiving and guiding the paper, a spreader positioned to enter between the opened sides of the paper, a retaining bar lying within and close to one side of the opened paper during its said movement, and means for placing the inserts within the opened paper as it passes through said trough.

27. A device for opening a folded paper comprising means for holding one ply of the paper, means for moving the other ply relatively to the first, and separating means adapted to move into position against the inner side of the first mentioned ply when the second mentioned ply is withdrawn, whereby when said second mentioned ply is returned to original position, said separating means will be positioned between said plies.

28. In a device for separating the plies of a folded paper, a separator plate adapted to engage and be held against a face of the paper adjacent to an edge other than that along which it is folded, a feeding foot adapted to engage the same face of the paper, and means for reciprocating said feeding foot away from and towards the separator plate to thereby withdraw one ply of the paper from beneath and to then place it over said separator plate.

29. In a device for separating the plies of a folded paper, a separator plate adapted to be pressed against a face of the paper adjacent to an edge other than that where folded, a feeding foot and a retaining foot engaging opposite faces of the paper, and means for reciprocating the feeding foot from and towards the separator plate to thereby withdraw one ply of the paper from beneath the separator plate and to then place it at the opposite side of the separator plate.

30. An opening device comprising means for holding one ply of the paper against movement, means for reciprocating the edgemost portion of the other ply of the paper toward and away from its folded edge, separating means adapted to come into position between the plies when the second mentioned ply is moved back to original position, and means for increasing the separation caused by the interposition of said separating means between said plies.

31. The combination with a series of paper receiving heads, means for delivering paper sections from each head, means for opening the paper section from the first head, means for advancing said opened section to receive the sections from the other heads and means for moving the sections from the other heads to one side within the open section to facilitate insertion of successive sections.

Signed at Seattle, Washington this 1st day of April 1919.

SEVERIN HALVORSEN.